Patented July 18, 1950

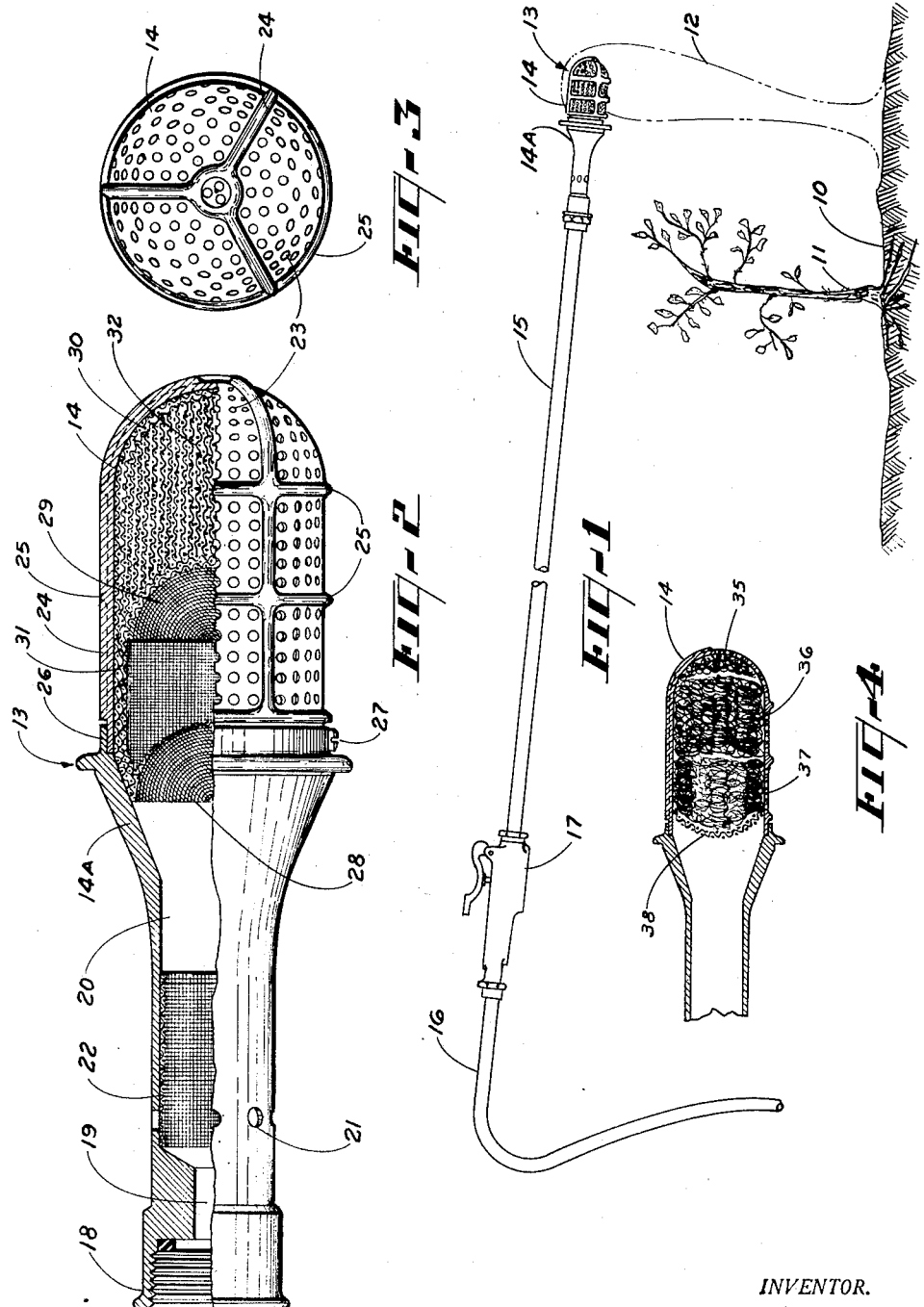

2,515,600

UNITED STATES PATENT OFFICE 2,515,600

IRRIGATOR HEAD

Stanley Alfred Hayes, Pasadena, Calif.

Application August 13, 1945, Serial No. 610,449

1 Claim. (Cl. 261—116)

This invention relates to irrigation and provides a novel method and apparatus which permits plants and the like to be adequately watered without erosion of soil from the roots.

In greenhouses, conservatories, nurseries, gardens, etc., it is customary to water individual plants with water sprays. The householder with only a few plants to water may obtain satisfactory results with a primitive watering can equipped with a low-velocity spray head. However, even in such cases, delicate plants can be damaged by the resulting wash, which tends to erode soil from the roots, and every gardener is familiar with the much greater damage which can result from the spray of higher velocity projected by a conventional nozzle on a garden hose. The problem becomes aggravated as the scale of the irrigating operation is increased, and the damage resulting from spray irrigation in commercial gardening in greenhouses, nurseries and the like runs into many thousands of dollars annually, for in an effort to speed the work involved in such large enterprises, the tendency is to use coarse sprays or sprays of high velocity, both of which tend to increase erosion and consequent damage.

As a result of my investigations, I have discovered that the erosive effect of streams of water can be reduced substantially by dispersing large volumes of gas in the stream. Thus, I have discovered that a heavy flow of water, which otherwise would cause severe washing of soil in plant watering operations, will not result in substantial washing or erosion if, at the time contact is made with the soil, the flow contains a relatively large proportion of finely dispersed air. This air, or other undissolved gas, is contained as fine bubbles in the water stream and apparently exerts a cushioning effect which largely inhibits erosion.

A stream of water containing dispersed air and employed for irrigation in accordance with my invention appears opaque and somewhat foamy, but it is not a true foam and is short-lived, so that it should be brought into contact with the soil before the air with which it is super-saturated has escaped. Preferably, the velocity of the stream should be well below that at which it tends to form a spray, for the lower the velocity of the water the less washing effect is obtained and the greater the cushioning effect of the included gas. Moreover, I have observed a tendency for the gas to be retained longer by the water under such circumstances.

A flow of water having large quantities of air dispersed therein as bubbles or the like and suitable for irrigation use, is secured, in accordance with my invention, by passing the water stream at relatively high velocity through an aspirator, so that air or the like is sucked into the stream and dispersed therein as fine bubbles. The velocity of the stream containing the air is then reduced, preferably by passing it through a series of baffles in the form of fine screens or a mass of knitted wire, and then ejected from an irrigator head to fall upon the area to be irrigated at low velocity and containing a large proportion of finely dispersed air. In my preferred practice, the water issuing from the irrigator has such a low velocity that it does not rise appreciably above the irrigator surface, but rather falls as an apparently viscous mass. Since the super-saturated mixture thus produced is evanescent, with the gas beginning to escape as soon as the mixture leaves the irrigator head, it is desirable to hold the latter relatively close, say within a few feet or even inches, to the area to be irrigated. However, I have discovered that the washing effect of the air-containing stream, even when it is permitted to drop on the soil from a height of several feet, is slight.

The stream of water produced in accordance with my invention preferably is not a spray or jet, but rather a short-lived semifoam which falls with substantially no horizontal component upon the area to be irrigated and breaks immediately, with the air contained in the stream acting as a cushion to prevent erosion through reduction of the effective velocity of the stream.

These and other features of my invention will be understood more thoroughly in the light of the following detailed description, taken in conjunction with the accompanying drawing in which:

Fig. 1 is a diagram illustrating the irrigation method of my invention;

Fig. 2 is a longitudinal view, partly in section, of a preferred form of the irrigator head of my invention and adapted to produce the low velocity stream of water containing dispersed gas;

Fig. 3 is an end view of the front of the irrigator head of Fig. 2; and

Fig. 4 is a longitudinal sectional diagram through the domed front of the irrigator, showing a modified form of packing.

Referring to Fig. 1, it will be observed that the soil 10 in the neighborhood of a growing plant 11 rooted in the soil is irrigated by a falling stream of water 12 having finely dispersed therein a relatively large quantity of air.

The stream of mixed air and water originates at an irrigator head 13 having a perforated domed front 14 attached to the front of a flared rear portion 14A containing an aspirator and attached at the rear to a pipe 15 of convenient length. The opposite end of the pipe is connected to a water supply means such as a hose 16 through a valve 17 mounted on the pipe.

Conveniently the valve is of the lever type which remains closed except when the valve is clasped in the hand and the lever depressed.

The pipe or tube preferably is seamless and of light gauge and weight, so as to facilitate handling. Light gauge aluminum alloy tubing is satisfactory.

The pipe may be attached to the irrigator head and the valve assembly by any convenient type of pressure-tight joint.

In some instances, for example in the watering of potted plants or those growing in an elevated bed in a greenhouse, the pipe may be shortened or omitted entirely, so that the operator is close to the work.

The nature of the mixed stream of air and water and the manner in which it is formed will best be understood through reference to Fig. 2, wherein the flared rear portion 14A of the head 13 is shown as an integrally formed hollow member comprising a threaded female connector or coupling 18 for attachment to a male coupling on the end of the pipe, followed serially by a constricted section 19 and a flared chamber 20. As the water passes through the restricted portion, its velocity is increased momentarily to produce an aspirating effect at the rear of the flared chamber. The suction thus created causes air to be drawn into the chamber through a series of breather holes 21 spaced radially around the rear of the chamber. The air thus introduced is mixed intimately with the water in the chamber. Thereafter, the velocity of the stream is reduced by the increasing cross-section of the flared chamber.

To inhibit the collect of dirt at the breather holes of the aspirator and the entrance of the dirt into the irrigator head with consequent plugging, it is desirable to place a cylinder of fine screen 22 of brass or other corrosion-resistant material within the head adjacent the breather holes.

The mixed stream of air and water passes from the flared chamber into the hollow outlet member 14 which is cylindrical in cross-section and has a domed end. The wall of the outlet member in both the cylindrical and the domed portions is thin and uniformly perforated, say with $\frac{3}{32}''$ diameter holes 23 on $\frac{7}{16}''$ centers. The wall is reinforced by longitudinal outside ribs 24 and circumferential ribs 25 cast integrally therewith.

The outlet member is attached to the flared or rear member of the irrigator head at a circular slip joint 26 in which the outlet member is female, and is held in this position by radially disposed screws 27 passing through the joint members.

Even taking into account the velocity-reduction effect of the flared section, the mixture of air and water enters the outlet member of the head at substantial velocity, and to prevent this velocity from causing a spray to issue from the head and to assure adequate dispersion of the air in the water, the interior of the outlet member is provided with a series of baffles, preferably in the form of screens. Thus the stream entering the outlet chamber first impinges on and passes through a domed baffle 28 of brass screen or the like, thence through a second domed baffle 29 placed intermediate the chamber and finally through a third domed baffle 30 fitted into the end of the chamber. A cylindrical baffle 31 composed of a multiplicity of screens telescoped one within the other is placed adjacent the wall between the first two domed baffles 28, 29 and the space between the second and third domed baffles 29, 30 is substantially filled by a group 32 of telescoped rolls of screen.

The screens employed as baffles, etc. within the head should be of corrosion resistant material such as brass, bronze or plastic. Screen with 24 meshes to the inch is suitable.

The screen type of packing just described is excellent from the standpoint of result, but it is relatively expensive to fabricate and install. Other and cheaper types of baffle structure may, therefore, be desirable. One of the most satisfactory is illustrated in Fig. 4 in which the packing comprises loosely-knit wire mesh of the type employed for scouring household utensils. Such mesh is knitted, as distinguished from woven, of fine wire and may be compressed into pads of almost any desired porosity.

In the domed head 14 of Fig. 4 the packing comprises a front pad 35 which is compressed fairly tightly and fitted into the domed portion. This is followed by a cylindrical pad 36 which occupies about the same position as the group of screens 32 in Fig. 2 and is compressed less than the front pad and hence offers less resistance to the flow of water. Back of the cylindrical pad 36 and adjacent the flared portion of the irrigator head is a loosely compressed annular pad 37, all three of the pads being held in place by a domed screen 38 positioned back of the annular pad.

The three pads are all formed of the knitted wire mesh and are easily formed and placed.

The two main members 14, 14A of the irrigator head may be machined, but preferably are diecast from aluminum or other lightweight alloys.

The size and spacing of the breather holes in the aspirator section of the head, and the size of those in the outlet member are not critical, but should be so proportioned that the mixture of air and water issues as a frothy stream, rather than as a group of jets, and falls as a single stream upon the area to be irrigated.

To consider a numerical example, a head adapted for use on the end of a $\frac{3}{4}''$ inside diameter pipe with a water pressure of about 60 pounds per square inch has a flared member about $3\frac{3}{4}''$ long, and an outlet member 3'' long and about 2'' in diameter outside. This structure is provided with 8 breather holes of $\frac{1}{8}''$ diameter and the holes in the outlet portion are $\frac{3}{32}''$ in diameter on about $\frac{7}{16}''$ centers.

The invention makes possible the thorough watering of delicate plants and the like speedily and with unskilled labor and without danger of injury due to impingement of a forceful jet on the foliage or due to washing away of soil from the roots. As indicated hereinbefore, the intimate mixture of air and water is short-lived, so that the head should be held as close to the soil as is convenient. However, even with a fall of several feet from head to soil, enough air is retained in the stream to exert a substantial cushioning effect and to reduce soil erosion to only a small fraction of that resulting from a conventional stream or spray of equal volume per unit time.

I claim:

In an irrigator head the combination comprising a domed outlet member open at one end and including side walls, the domed end and side walls of the outlet member being perforated, a conduit of smaller diameter than the outlet member, the conduit being flared at one end and connected at the flared end to the open end of the outlet member, means at the other end of the conduit for connection to a source of water under pressure, a reduced diameter throat in the conduit adjacent said other end, a plurality of ports in the conduit wall adjacent the throat and on the downstream side of the throat, and a plurality of layers of packing arranged in diverse directions in the outlet member and substantially filling the outlet member, the packing being arranged to permit discharge of fluid entering the head in several directions through the plurality of perforations and so freely as not to destroy suction in said plurality of ports.

STANLEY ALFRED HAYES.

REFERENCES CITED

The following references are of record in the file of this patent:

UNITED STATES PATENTS

| Number | Name | Date |
| --- | --- | --- |
| 259,091 | Burrett | June 6, 1882 |
| 1,401,462 | Circle | Dec. 27, 1921 |
| 1,457,895 | Campanella | June 5, 1923 |
| 1,650,081 | Lindsay | Nov. 22, 1927 |
| 2,138,133 | Betzler | Nov. 29, 1938 |
| 2,183,561 | Hamblin | Dec. 19, 1939 |
| 2,210,846 | Aghnides | Aug. 6, 1940 |
| 2,213,955 | De Freitas | Sept. 10, 1940 |
| 2,316,832 | Aghnides | Apr. 20, 1943 |
| 2,375,833 | Urquhart | May 15, 1945 |

FOREIGN PATENTS

| Number | Country | Date |
| --- | --- | --- |
| 441,441 | Great Britain | Jan. 20, 1936 |
| 468,687 | Great Britain | July 6, 1937 |